(12) United States Patent
Kelsic et al.

(10) Patent No.: US 6,536,555 B1
(45) Date of Patent: Mar. 25, 2003

(54) MULTILAYER ACOUSTIC DAMPER FOR A DISC DRIVE

(75) Inventors: Gary Frank Kelsic, Longmont, CO (US); Bruce Joseph Oxley, Boulder, CO (US); Frank Bernett, Longmont, CO (US); Richard W. Deichert, Broomfield, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/686,014

(22) Filed: Oct. 10, 2000

Related U.S. Application Data

(60) Provisional application No. 60/158,831, filed on Oct. 12, 1999.

(51) Int. Cl.$^7$ ................................................. F16F 15/00
(52) U.S. Cl. .......................... 181/207; 181/208; 369/263
(58) Field of Search ................................. 181/207, 208; 369/247, 263; 428/68, 71, 75, 137, 172, 201, 220, 317.7, 319.3, 913; 360/97.02, 98.08

(56) References Cited

U.S. PATENT DOCUMENTS

| | | |
|---|---|---|
| 5,282,100 A | 1/1994 | Tacklind et al. |
| 5,483,397 A | 1/1996 | Gifford et al. |
| 5,666,239 A | 9/1997 | Pottebaum |
| 5,691,037 A * | 11/1997 | McCutcheon et al. ...... 181/207 |
| 5,757,580 A | 5/1998 | Andress et al. |
| 5,761,184 A * | 6/1998 | Dauber et al. .............. 369/427 |
| 5,777,821 A | 7/1998 | Pottebaum |
| 5,781,373 A | 7/1998 | Larson et al. |
| 5,982,580 A | 11/1999 | Woldemar et al. |
| 6,005,768 A | 12/1999 | Whan-Haeng Jo |
| 6,285,525 B1 * | 9/2001 | McCutcheon et al. ... 360/98.08 |

OTHER PUBLICATIONS

3M Brochure "Resonant Vibration Control by 3M Constrained Layer High Damping Composites", undated.

"Improve Product Performance With Scotchdamp Brand Vibration Control Systems," 3M Vibration Control Systems, 3M Industrial Tape and Specialties Division, 3M Center, Building 220–8E–04, St. Paul, MN 55144–1000, undated.

* cited by examiner

*Primary Examiner*—Khanh Dang
(74) *Attorney, Agent, or Firm*—Merchant & Gould P.C.

(57) ABSTRACT

A disc drive top cover incorporates an acoustic damper having alternating constraining layer material and damping layer material. Each constraining material layer is a sheet material having a high mechanical stiffness. Each damping material layer is a visco-damping adhesive having a preselected maximum damping efficiency for a particular disc drive operating condition. The acoustic damper may also include a carrier layer between damping layers so that multiple layers of damping material can be incorporated between any two constraining layers.

14 Claims, 3 Drawing Sheets

MULTILAYER ACOUSTIC DAMPER FOR A DISC DRIVE

RELATED APPLICATIONS

This application claims the benefit of priority of U.S. Provisional Patent Application Ser. No. 60/158,831 entitled "MULTILAYER ACOUSTIC DAMPERS WITH MULTIPLE ADHESIVE CONSTRUCTION," filed Oct. 12, 1999.

FIELD OF THE INVENTION

This application relates to magnetic disc drives and more particularly to a disc drive assembly having a multilayer acoustic damper to improve disc drive acoustics.

BACKGROUND OF THE INVENTION

Disc drives are data storage devices that store digital data in magnetic form on a rotating storage medium on an information storage disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads in an arc across the surface of the discs. Each of the concentric tracks is generally divided into a plurality of separately addressable data sectors. The recording transducer, e.g. a magneto resistive read/write head, is used to transfer data between a desired track and an external environment. During a write operation, data is written onto the disc track and during a read operation the head senses the data previously written on the disc track and transfers the information to a host computing system.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an arcuate fashion between an inner radius and an outer radius of the discs.

A major concern in the disc drive field is acoustic noise generated during disc drive operation. Such noise is aggravating to the user and its minimization is one of the disc drive designer's goals. Vibrations caused by rotation of the spindle motor, air turbulence around the outer diameter of rotating discs, and other normal operation force transmitting events lead to acoustic emissions from a disc drive. Typically, the disc drive housing, i.e., base plate and top cover, exhibit negligible properties for damping structural vibrations. In fact, the top cover often acts like a vibrating speaker to amplify acoustic emissions, thus exacerbating the acoustic emission problem. An acoustic damper is often added to the housing to minimize acoustic emissions from the disc drive. Dampers can be integrated into the housing walls or can be added as a separate piece or unit to a housing surface.

Acoustic dampers typically are made from a thin layer of metal such as steel adhered to a surface of the housing by a visco-damping layer of adhesive. The damper reduces acoustic emissions from the housing by two mechanisms: (1) the additional mass of the damper adhered to the housing serves to shift the natural frequency of the housing and thus reduce the overall displacements induced by acoustic sources; and (2) the visco-damping adhesive absorbs acoustic energy. The combined effect on the disc drive is to reduce the acoustic emissions and provide a quieter and more stress free environment for the user.

A major shortcoming of current disc drive acoustic dampers is their inability to absorb energy over a varied temperature and frequency range. Conventionally, adhesives formulated for room temperature are utilized in acoustic dampers because disc drives are processed and assembled at room temperature and because the temperature within the disc drive often remains in close approximation to room temperature. However, the new generation of 7200 rpm, 10,000 rpm and 12,500 rpm disc drives operates within a normal temperature range of 20°–55° C. The increased operating temperature tends to decrease the tack of the room temperature formulated adhesives as well as to reduce the adhesive's effectiveness at dampening acoustic emissions. Against this backdrop the present invention has been developed.

SUMMARY OF THE INVENTION

The above problems and other problems have been solved in accordance with the present invention by incorporating into the damper a number of visco-damping layers, each formulated to optimally perform in a specific temperature or frequency range.

An acoustic damper in accordance with one embodiment of the present invention is adapted to be adhered to a top cover of a disc drive by a first adhesive layer. The first adhesive layer has a maximal damping efficiency within a first operating condition. The acoustic damper has a first constraining layer on the first adhesive layer. A second adhesive layer is sandwiched between the first constraining layer and a second constraining layer. The second adhesive layer is formulated for maximal damping efficiency within a second operating condition where the first and second operating conditions are different. The first and second operating conditions could be temperature ranges or acoustic frequency ranges.

Another embodiment of the present invention is a top cover for a disc drive having an acoustic damper adhered to either the top surface or the bottom surface of the cover. The acoustic damper is adhered to the top cover with a first adhesive layer. The first adhesive layer has a maximal damping efficiency within a first operating condition such as a specific temperature or frequency range. A first constraining layer covers the first adhesive layer. A second adhesive layer is sandwiched between the first constraining layer and a second constraining layer. The second adhesive layer is formulated for maximal damping efficiency within a second operating condition such as another temperature or frequency range different from the first range. The first and second operating conditions may be temperature ranges or acoustic frequency ranges.

These and various other features as well as advantages which characterize the present invention will be apparent from a reading of the following detailed description and a review of the associated drawings.

DETAILED DESCRIPTION

Figure 1:
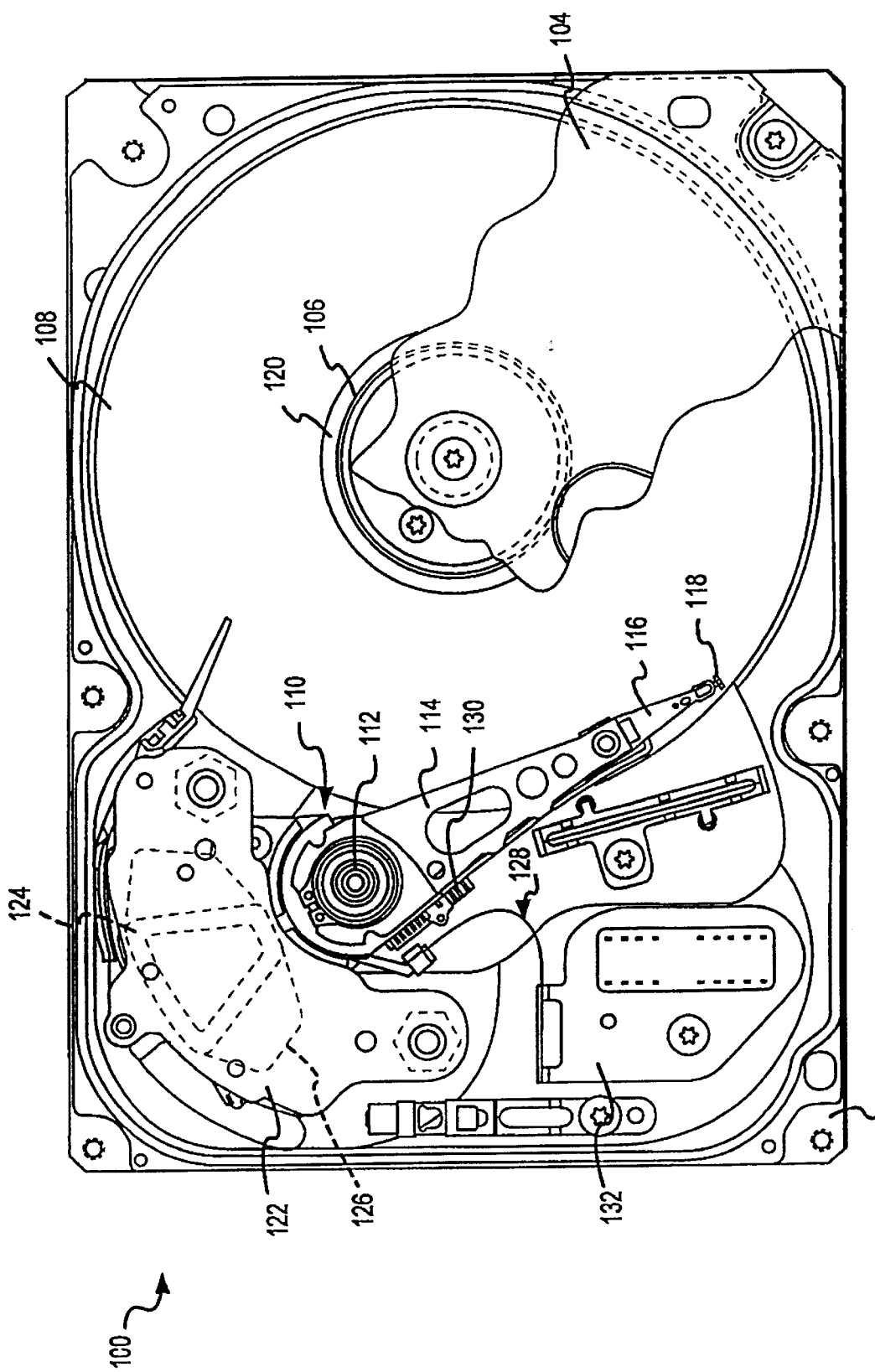
FIG. 1 is a plan view of a disc drive assembly incorporating a preferred embodiment of the present invention with portions broken away to reveal components within the disc drive.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form a housing having an internal, sealed environment for the disc drive in a conventional manner. This assembly is called a head disc assembly (HDA). The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider (not shown) enabling the head 118 to fly in close proximity above the corresponding surface of the associated disc 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator arms 114 when the heads are parked.

The radial position of the heads 118 is controlled through the use of a voice coil motor (VCM) 122, which typically includes a coil 124 attached to the actuator assembly 110, as well as one or more permanent magnets 126 which are spaced apart and establish a vertical magnetic field in which the coil 124 is immersed. The controlled application of current to the coil 124 causes magnetic interaction between the permanent magnets 126 and the coil 124 so that the coil 124 moves in accordance with the well known Lorentz relationship. As the coil 124 moves, the actuator assembly 110 pivots about the bearing shaft assembly 112 and the heads 118 are caused to move across the surfaces of the discs 108.

A flex assembly 128 provides the requisite electrical connection paths for the actuator assembly 110 while allowing pivotal movement of the actuator assembly 110 during operation. The flex assembly includes a printed circuit board 130 to which head wires (not shown) are connected; the head wires being routed along the actuator arms 114 and the flexures 116 to the heads 118. The printed circuit board 130 typically includes circuitry for controlling the write currents applied to the heads 118 during a write operation and for amplifying read signals generated by the heads 118 during a read operation. The flex assembly terminates at a flex bracket 132 for communication through the base deck 102 to a disc drive printed circuit board (not shown) mounted to the bottom side of the disc drive 100.

An acoustic damper 134 in accordance with a preferred embodiment of the present invention is prepared from multiple layers of alternating constraining 136 and damping material layers 138. (see FIGS. 2 and 3). Acoustic damping effectiveness of the acoustic damper is optimized for disc drive operating conditions, e.g., optimizing for a varying operational temperature within the disc drive and/or optimizing for problematic acoustic frequency emissions by the disc drive by selectively arranging multiple layers of damping material having target damping characteristics in the acoustic damper. When complete, acoustic dampers are attached to the disc drive housing during the disc drive manufacturing process.

Figure 2:
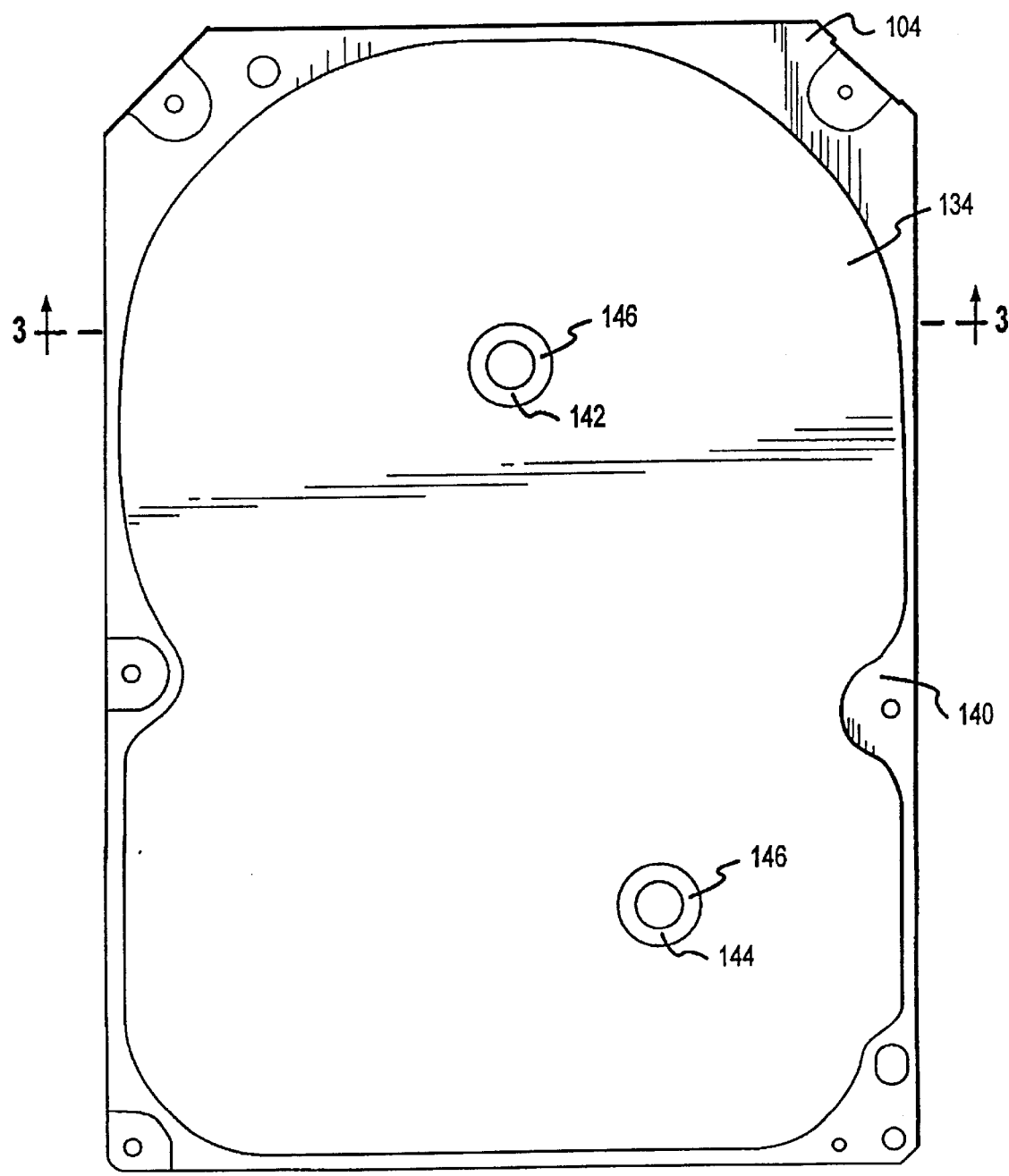
FIG. 2 is a top view of the top cover incorporating an acoustic damper in accordance with a preferred embodiment of the present invention.

FIG. 2 shows a top view of one embodiment of the acoustic damper 134 in accordance with the present invention adhered to the top cover 104 of a disc drive 100. The acoustic damper 134 has a generally flat plate shape that mimics the shape of the top planar surface 140 or the bottom planar surface (not shown) of the top cover 104. Typically, the acoustic damper 134 has two apertures 142 and 144 positioned over top cover screws 146 that anchor the top cover 104 to the spindle motor 106 and to the actuator assembly 110. The aperture 142 is aligned over the spindle motor securing screw 146 and the second aperture 144 is aligned over the actuator assembly securing screw 146. Once the acoustic damper 134 is adhesively bonded to the top cover 104 it essentially becomes an integral part of the top cover. The acoustic damper 134 may have other configurations of apertures and shapes dependent on the particular configuration of the top cover 104 so that the acoustic damper 134 preferably fits snugly against the top cover of the disc drive. Maximum acoustic damping is attained when a maximum amount of surface area of the top cover is engaged. However, particular cover shapes may only have particular areas or regions to be damped. As such, any acoustic damper shape is envisioned to be within the scope of the present invention provided it sits flat against the top cover and has the characteristic damping properties discussed in greater detail below.

Figure 3:
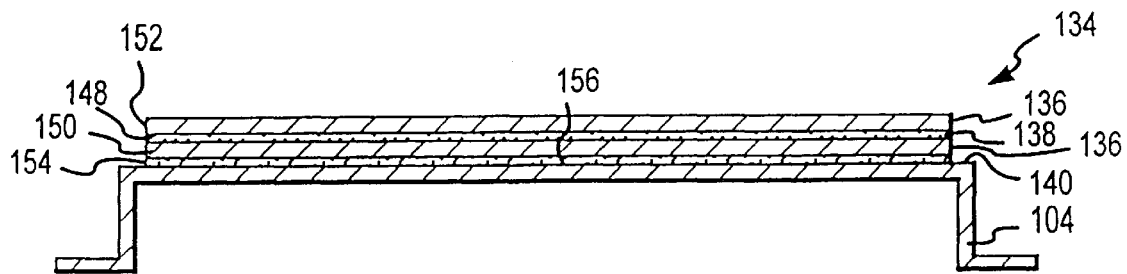
FIG. 3 is a cross-sectional view through the acoustic damper and top cover taken along line 3—3 in FIG. 2.

FIG. 3 is a cross section taken along line 3—3 of FIG. 2 illustrating one preferred arrangement for the acoustic damper 134. The acoustic damper 134 is typically formed from multiple alternating layers or portions of constraining material and damping material. Preferably, the constraining layers 136 are in direct and intimate contact with the damping layers 138 to maximize the ability of the damping layer to absorb acoustic emissions from the disc drive. Additionally, due to shear forces acting on the top cover and constraining layers of the disc drive, the damping layers are preferably positioned as the middle portions between either the top cover and constraining layer or between two constraining layers.

The constraining layers 136 are each made of a stiff rigid material that adds mass to the top cover and in effect lowers the overall acoustic induced displacements of the top cover 104. The material is typically made from a sheet material having a high mechanical stiffness. For example, the constraining layers can be made of a metal such as stainless steel or aluminum, or can be made of a mica or a hard plastic material such as polycarbonate. Constraining layers are typically between about 0.001 inches and about 0.03 inches thick, and are preferably between about 0.01 and about 0.02 inches thick. It is envisioned that thicker constraining layers could also be used in embodiments of the present invention, although thicker constraining layers tend to add manufacturing costs to the acoustic damper 134.

The damping layers 138 shown in FIG. 3 are each made of viscoelastic or visco-damp adhesives formulated for maximum damping effectiveness within a specific temperature range, where each temperature range has an upper and lower temperature boundary. Visco-damp adhesives are polymers that act to dissipate energy by flexing, i.e., moving, under the influence of the introduced acoustic energy. Movement of the polymer absorbs or dissipates the acoustic energy and thus minimizes the level of energy emitted through the top cover of the disc drive. A damping adhesive formulated to have maximum resistance to movement within a particular temperature range is typically dependent on the polymer formulation and the amount of polymer crosslinking. Thus, a polymer formulated for room temperature damping may become excessively viscous at higher temperatures and thus not provide a maximal damping efficiency at the elevated temperature. It should be noted, however, that although an adhesive has a range of conditions where it has a maximal and thus optimal damping effectiveness, the adhesive will still likely provide some level of damping effectiveness outside of that temperature range. One example of a visco-damped adhesive formulated for use at room temperature is Sony 4410. An example of a visco-damped adhesive formulated for use at elevated temperatures is Minnesota Mining and Manufacturing (3M) 3M140.

Damping layers are typically between about 0.0002 and 0.005 inches thick, and preferably between about 0.0005 and about 0.002 inches thick. It is envisioned that other levels of thickness for the damping layer be used as long as the tacky properties of the adhesive be maintained.

One exemplary acoustic damper 134 configuration is shown in FIG. 3. A second damping layer 148, formulated for maximum damping efficiency within a high temperature range, is sandwiched between a first and second constraining layers 150 and 152 respectively. A first damping layer 154, formulated for maximum damping efficiency within a room temperature range, is sandwiched between the top surface 140 of the top cover 104 and the bottom surface 156 of the first constraining layer 150.

Preferably, multiple damping layers are used to alternatingly adhere multiple constraining layers together to form the acoustic damper in a manner similar to that shown in FIG. 3. Damping layers having effectiveness within a room temperature range may be combined with damping layers having effectiveness at other target disc drive operation temperature ranges. In this manner, acoustic dampers can be produced having multiple layers of damping material formulated for maximal damping properties at different, i.e., nonidentical, ranges of operating temperatures.

Damping adhesives are adhered to constraining layers within temperature ranges at which the adhesive have a maximum "tacky" character. Typically, the temperature range at which the adhesive has a maximum tacky character corresponds to the temperature range at which the adhesive has maximum damping effectiveness. As such, it is preferable to adhere the two constraining layers together with a higher temperature visco-damping adhesive so that the acoustic damper can be heated to the appropriate temperature for that adhesive. Preferably, a room temperature range visco-damping adhesive is used to adhere the pre-formed acoustic damper, having the higher temperature visco-damping adhesive, to the top cover, thus, eliminating any detrimental elevated temperatures during the disc drive manufacturing process.

A presently preferred acoustic damper for use in the new generation of high rpm disc drives is to adhere two constraining 0.01 inch layers of stainless steel together with a 0.002 inch layer of high temperature visco-damp adhesive. The lamination is performed within the temperature range of the high temperature visco-damp adhesive, where the adhesive has maximal tacky properties. The preformed acoustic damper is then bonded to the top surface of the top cover using a room temperature visco-damp adhesive at room temperature. The acoustic damper thus formed has maximal acoustic damping properties at room temperature and also at higher operating temperatures, which correspond to the higher operational temperatures of the disc drive.

It should be understood that the acoustic damper as shown in FIG. 3, although described in detail with regard to positioning on the top surface 140 of the top cover 104, may alternatively be positioned against the bottom surface of the top cover 104. It is also envisioned that the acoustic damper 134 could be positioned on the base plate 102. Further, the acoustic damper could be placed on other disc drive structural components, including any component of the disc drive that is rigid and capable of transmitting an acoustic vibration.

A second embodiment of the present invention contemplates the use of visco-dampen adhesives in the acoustic damper 134 formulated for maximum damping effectiveness at specific acoustic frequencies or tones (as compared to the above discussed visco-dampen adhesives which have maximum damping effectiveness within a defined temperature range for a standard frequency range) The adhesives are formulated to have maximal resistance to frequencies that resonate within specific target frequency ranges. Examples of such formulations include: Avery Dennison HD30F4, Flexcon A374, Roush A4080B, etc.

It is also envisioned that an acoustic damper in accordance with the present invention may incorporate a mixture of damping layer characteristics. For example, one damping layer may have a maximal damping effectiveness within a specified temperature range and another damping layer has maximal damping effectiveness within a specified acoustic frequency range. In this manner, composite acoustic dampers can be customized to have maximal damping effectiveness over a wide range of disc drive operating conditions, i.e., temperatures/specific problematic tones. Additionally, it is envisioned that within any one damping layer a maximum damping efficiency for a combination of disc operating conditions could be selected. For example, a single damping layer adhesive may have a combination temperature range/frequency range in which the user is interested in having maximum damping efficiency, in this case the user can select dampers on the basis of multiple disc drive operating conditions.

Figure 4:
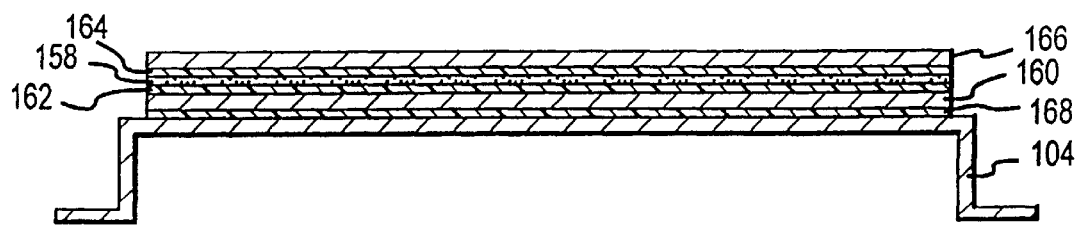
FIG. 4 is a representative cross-sectional view through the acoustic damper and top cover in accordance with another preferred embodiment of the present invention in which a carrier layer is interposed between two damping layers.

A third embodiment of the present invention contemplates the combination of multiple damping layer adhesives sandwiched between any two constraining layers (or constraining layer and top cover) where each damping layer is separated from the next damping layer by a carrier layer 158. As shown in FIG. 4., multiple adhesive characteristics can be incorporated in the acoustic damper in this way without having to add additional constraining layers. One such carrier layer 158 is a polyester film. The potential number of damping layers between any two constraining layers is bound only by thickness and cost restraints.

An example of one possible arrangement of the third embodiment shown in FIG. 4 is a first constraining layer 160, a second damping layer 162 formulated for maximal damping effectiveness at a first disc drive operating condition, a carrier layer of Mylar™ 158, a third damping layer 164 formulated for maximal damping effectiveness at a second disc drive operating condition and a second constraining layer 166. The first constraining layer 160 is adhered to the top cover 104 using a first damping layer 168 formulated for maximal damping effectiveness at a third disc drive operating condition.

EXAMPLE

The following Example is intended to illustrate the above invention and should not be construed so as to narrow its scope.

EXAMPLE

High Temperature Adhesive Minimize Disc Drive Acoustic Emissions Under Higher Temperature Operating Conditions Disc drive acoustic emissions were sampled for several acoustic dampers at several disc drive operating temperatures. Top cover acoustic dampers were installed in standard disc drive assemblies and tested for acoustic emissions under three disc drive operating temperatures, 23° C. (cold), 45° C. (warm) and 55° C. (hot). All disc drive top covers were identical in material and thickness (aluminum/0.02 inches thick (20 mils))(note that 1/1,000 of an inch is equal to one mil). Test acoustic dampers were:

Sample #1: the top cover alone in the absence of any adhered acoustic damper;

Sample #2: the top cover adhered to a second 20 mils thick sheet of stainless steel by a 2 mils thick layer of room temperature adhesive (Sony);

Sample #3: the top cover adhered to two 10 mils thick sheets of stainless steel, the first sheet of stainless steel separated from the top cover by a 2 mils thick layer of room temperature adhesive (Sony) and the second sheet of stainless steel separated from the first sheet of stainless steel by a second layer of 2 mils thick room temperature adhesive (Sony);

Sample #4: the top cover adhered to two 10 mils thick sheets of stainless steel, the first sheet of stainless steel separated from the top cover by a 2 mils thick layer of room temperature adhesive (Sony) and the second sheet of stainless steel separated from the first sheet of stainless steel by a 2 mils thick layer of high temperature adhesive (3M140).

Results

As shown in Table 1, samples 3 and 4 had greater effectiveness at dampening out acoustic emissions at each operating temperature tested. Additionally, sample 4 showed no increase in acoustic emissions under elevated temperature operating temperatures as compared to room temperature operating conditions. These results show that varying the adhesive formulation to match the disc drive operating conditions can have dramatic effects on minimizing acoustic emissions from the disc drive.

TABLE 1

| Sample # | Formulation | Decibels at 23° C. | Decibels at 45° C. | Decibels at 55° C. |
| --- | --- | --- | --- | --- |
| Sample #1 | Top Cover[a] | 35.2 | 35.9 | 36.3 |
| Sample #2 | Top Cover[a] Room Temp Adh.[b] Stainless Steel[c] | 34.9 | 35.5 | 35.3 |
| Sample #3 | Top Cover[a] Room Temp Adh.[b] Stainless Steel[d] Room Temp Adh.[b] Stainless Steel[d] | 33.8 | | 34.5 |
| Sample #4 | Top Cover[a] Room Temp Adh.[b] Stainless Steel[d] High Temp Adh.[e] Stainless Steel[d] | 33.9 | | 33.9 |

[a]20 mils aluminum
[b]2 mils Sony 4410 room temperature formulated adhesive
[c]20 mils stainless steel
[d]10 mils stainless steel
[e]2 mils 3M140 high temperature formulated adhesive In summary, the present invention may be viewed as an acoustic damper (such as 134) adapted to be adhered to a top cover (such as 104) that dampens acoustic emissions from a disc drive (such as 100) over a first and second disc drive operating condition. The acoustic damper (such as 134) is adhered to the top cover (such as 104) by a first damping or adhesive layer (such as 154) that has a maximal damping efficiency within a first operating condition. A first constraining layer (such as 150) is adhered to the first damping layer (such as 154). A second damping layer (such as 148) is sandwiched between the first constraining layer (such as 150) and a second constraining layer (such as 152). The second damping layer (such as 148) is formulated for maximal damping efficiency within a second operating condition that is different than the second operating condition.

The first disc drive operating condition and the second disc drive operating condition may be temperature ranges. Alternatively, there may be combinations of conditions each including a (limited) temperature range.

The first disc drive operating condition may also be an acoustic frequency range and the second disc drive operating condition is a different acoustic frequency range. In another preferred embodiment of the present invention, the first operating condition is a temperature range and the second operating condition is an acoustic frequency range.

Alternatively, in another preferred embodiment of the present invention, the first operating condition may be a combination temperature and frequency range and the second operating condition may be a combination temperature and frequency range.

In another alternative, the present invention may be viewed as an acoustic damper (such as 134) that has a carrier layer (such as 158) between the second damping layer (such as 162) and the second constraining layer (such as 166). A third damping layer (such as 164) is sandwiched between the carrier layer and the second constraining layer (such as 166). The third damping layer (such as 164) is preferably formulated for maximal damping efficiency within a third operating condition with the third operating condition being different from the first operating condition and the second operating condition.

In another preferred embodiment of the present invention, the acoustic damper (such as 134) may include a third constraining layer and a third damping layer. The third damping layer is sandwiched between the second constraining layer (such as 152) and the third constraining layer, with the third damping layer formulated for maximal damping efficiency within a third operating condition in which the third operating condition is different from the first operating condition and the second operating condition.

In another preferred embodiment of the present invention, the first constraining layer (such as 150) and second constraining layer (such as 152) of the acoustic damper are stainless steel and the first damping layer (such as 154) and second damping layer (such as 148) are viscodamping polymers.

Stated still another way, the present invention includes may be viewed as a top cover (such as 104) for a disc drive (such as 100) having a top surface (such as 140) and a bottom surface with an acoustic damper (such as 134) adhered to either the top surface (such as 140) or the bottom surface of the top cover by a first damping layer (such as 154). The first damping layer (such as 154) has a maximal damping efficiency within a first disc drive operating condition. The acoustic damper (such as 134) further includes a first constraining layer (such as 150) on the first damping layer (such as 154) and a second damping layer (such as 148) sandwiched between the first constraining layer (such as 150) and a second constraining layer (such as 152). The second damping layer (such as 148) is formulated for maximal damping efficiency within a second operating condition where the first operating condition is different than the second operating condition.

The first operating condition may be a temperature range and the second operating condition may be a temperature range.

The first operating condition may also be an acoustic frequency range and the second operating condition an acoustic frequency range. In another preferred embodiment of the top cover of the present invention, the first operating condition is a temperature range and the second operating condition is an acoustic frequency range.

Alternatively, in another preferred embodiment of the top cover of the present invention, the first operating condition may be a combination temperature and frequency range and the second operating condition may be a combination temperature and frequency range.

In another alternative, the present invention may be viewed as a top cover having an acoustic damper (such as 134) that has a carrier layer (such as 158) between the second damping layer (such as 162) and the second constraining layer (such as 166). A third damping layer (such as 164) is sandwiched between the carrier layer (such as 158) and the second constraining layer (such as 166). The third damping layer (such as 164) is preferably formulated for maximal damping efficiency within a third operating condition with the third operating condition being different from the first operating condition and the second operating condition.

In another preferred embodiment of the top cover of the present invention, the acoustic damper (such as 134) may include a third damping layer sandwiched between the second constraining layer (such as 152) and a third constraining layer. The third damping layer is formulated for maximal damping efficiency within a third operating condition in which the third operating condition is different from the first operating condition and the second operating condition.

Finally, in another preferred embodiment of the top cover of the present invention, the first constraining layer (such as 150) and second constraining layer (such as 152) are stainless steel and the first damping layer (such as 154) and second damping layer (such as 148) are visco-damping polymers.

From the foregoing detailed description and examples, it will be evident that modifications and variations can be made in the products and processes of the invention without departing from the spirit and scope of the invention. Therefore, it is intended that all modifications and variations not departing from the spirit of the invention come within the scope of the claims and their equivalents.

What is claimed is:

1. A system for reducing acoustical noise, comprising:
   a data storage device including a base and a top cover operably attached thereto, the base and the top cover together forming a sealed environment in which is housed data storage components operable to store digital data;
   an acoustic damper coupled to the top cover of the data storage device via a visco-damping adhesive having a maximal damping efficiency within a first operating range, the acoustic damper comprising:
   a first constraining layer;
   a second constraining layer; and
   a first damping layer sandwiched between the first constraining layer and the second constraining layer, the first damping layer having a maximal damping efficiency within a second operating range different from the first operating range.

2. The system of claim 1, wherein the acoustic damper is coupled to the top cover exclusively using the visco-damping adhesive.

3. The system of claim 1, wherein the first operating range is a first temperature range and the second operating range is a second temperature range.

4. The system of claim 3, wherein the first temperature range has a minimum temperature, the second temperature range has a minimum temperature, and wherein the minimum temperature of the first temperature range is lower than the minimum temperature of the second temperature range.

5. The system of claim 1, wherein the first operating range is an acoustic frequency range and the second operating range is an acoustic frequency range.

6. The system of claim 1, wherein the acoustic damper further comprises:
   a carrier layer between the first damping layer and the second constraining layer; and
   a second damping layer sandwiched between the carrier layer and the second constraining layer formulated for maximal damping efficiency within a third operating range, wherein the third operating range is different from the first operating range and the second operating range.

7. The system of claim 6, wherein the carrier layer is a polyester film.

8. The system of claim 1, further comprising:
   a third constraining layer; and
   a third damping layer sandwiched between the second constraining layer and the third constraining layer, the third damping layer formulated for maximal damping efficiency within a third operating condition wherein the third operating condition is different from the first operating condition and the second operating condition.

9. The system of claim 1, wherein the base and the top cover together form an internal environment of the data storage device and wherein the acoustic damper is coupled to the top cover within the internal environment.

10. A method of reducing acoustical noise in a data storage device having a top cover, comprising steps of:
(a) selecting a visco-damping adhesive having a maximal damping efficiency between a first temperature and a second temperature;
(b) selecting an acoustic damper having a maximal damping efficiency between a third temperature and a fourth temperature, wherein the third temperature is greater than the first temperature;
(c) coupling the acoustic damper to the data storage device exclusively using the visco-damping adhesive.

11. The method of claim 10, wherein the acoustic damper comprises:
a first constraining layer;
a second constraining layer; and
a first damping layer sandwiched between the first constraining layer and the second constraining layer, the first damping layer having a maximal damping efficiency between the third temperature and the fourth temperature.

12. The method of claim 11, wherein the acoustic damper further comprises a carrier layer between the first damping layer and the second constraining layer; and
a second damping layer sandwiched between the carrier layer and the second constraining layer, the second damping layer having a maximal damping efficiency between a fifth temperature and a sixth temperature, wherein the fifth temperature is greater than the third temperature.

13. The method of claim 11, wherein coupling step (c) comprises coupling the acoustic damper to an outside surface of the top cover.

14. The method of claim 11, wherein the coupling step (c) comprises coupling the acoustic damper to an inside surface of the top cover.

* * * * *